April 16, 1935. T. M. KNOWLAND 1,998,161
METHOD OF AND APPARATUS FOR VULCANIZING RUBBER ARTICLES
Filed March 21, 1933
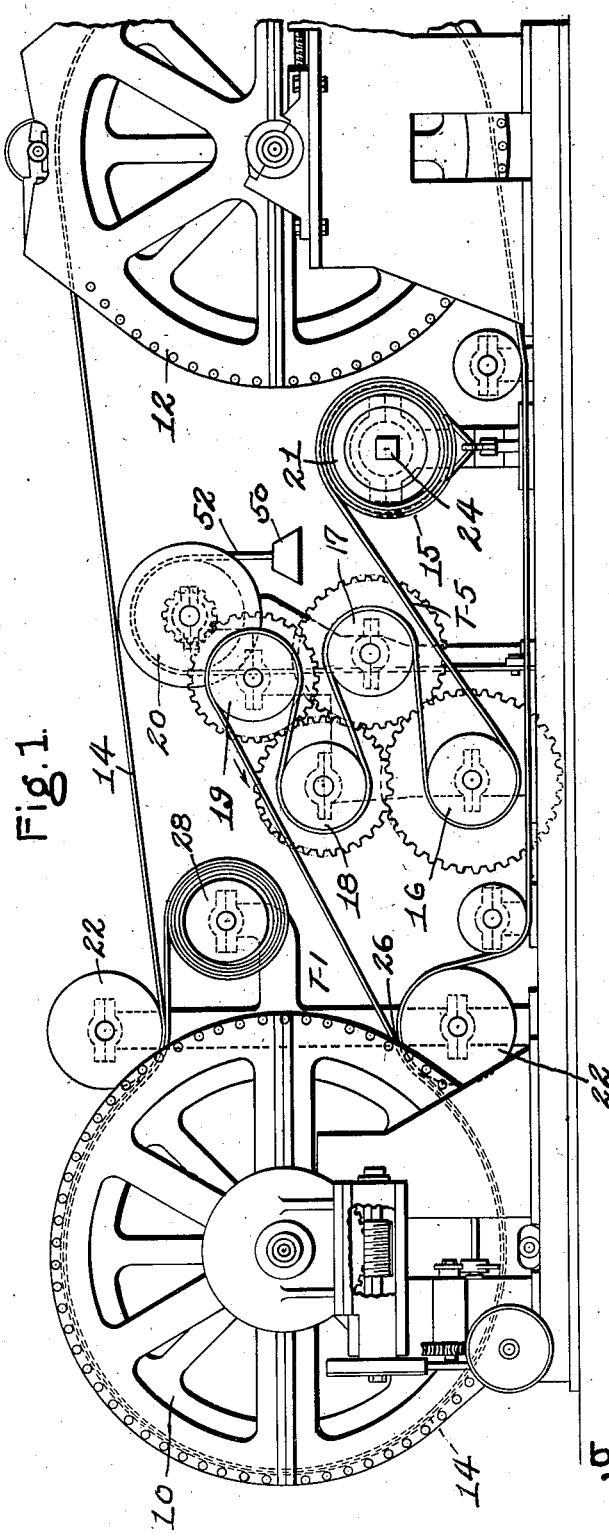
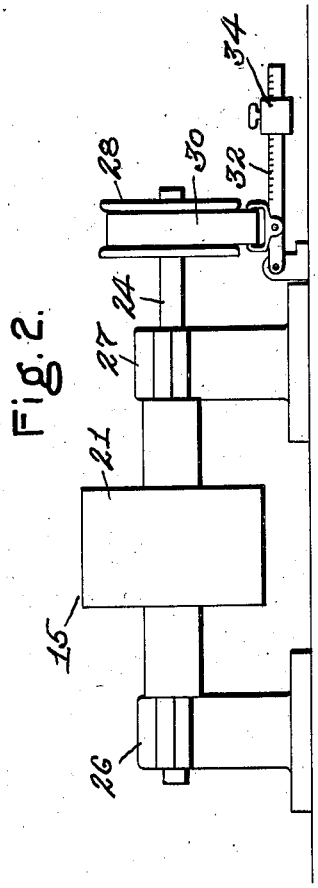
Inventor.
Thomas M. Knowland
by J. Stanley Churchill.
Atty.

Patented Apr. 16, 1935

1,998,161

UNITED STATES PATENT OFFICE 1,998,161

METHOD OF AND APPARATUS FOR VULCANIZING RUBBER ARTICLES

Thomas M. Knowland, Watertown, Mass., assignor to Boston Woven Hose and Rubber Company, Cambridge, Mass., a corporation of Massachusetts Application March 21, 1933, Serial No. 661,872

11 Claims. (Cl. 18—6)

This invention relates to a method of and apparatus for vulcanizing elongated rubber articles, and particularly rubber belting, whereby to produce belting and the like having little or no tendency to stretch. In one aspect my invention consists in a novel method of vulcanizing elongated rubber articles between a continuous band and a vulcanizing drum while holding the article under a constant and relatively high tension, built up therein by the drum and band pull on the article after it leaves the supply roll and as it is being drawn toward and onto the drum, thus producing a finished article having uniform inherent stretch in all portions thereof and eliminating the lack of uniformity found in such products manufactured by processes heretofore known.

In another aspect my invention consists in a method of vulcanizing elongated rubber articles under tension which is characterized by passing the article continuously from a supply reel to the vulcanizing means and progressively stretching the article to greater tension in successive portions thereof during its passage from the reel to the vulcanizing means, and holding the article under the relatively high tension thus produced during the vulcanizing operation, whereby the article produced is rendered uniform throughout its length as above and hereinafter pointed out.

Further features of the invention relate to a method and apparatus for vulcanizing elongated rubber articles wherein the article, as it is fed from a supply reel to the vulcanizing drum, is first stretched progressively to greater tension and thereafter placed under a predetermined tension, or under a tension to stretch the article a predetermined percentage of its length, prior to its engagement with the drum, the article being thereafter held in such condition during the vulcanizing operation.

The primary objects of the invention are the production of improved apparatus of the nature and for the purpose above and hereinafter defined and the making available a novel and improved method of manufacture wherein such apparatus may be usefully employed.

These and other features of the invention will be best understood and appreciated from the following description of a preferred embodiment therefore, selected for purposes of illustration and shown in the accompanying drawing, in which—

Fig. 1 is a side elevation, partly in section, of apparatus embodying the invention.

Fig. 2 is an end elevation of the let-off reel, with one form of braking device attached thereto.

Referring now to the drawing wherein I have illustrated a machine for vulcanizing rubber belting and similar products, the machine in general features of construction and mode of operation may be that shown in U. S. Patent No. 1,445,553 issued February 13, 1923, and in which 10 and 12 represent two rotatable drums over the peripheries of which an endless flexible band or belt of metal is arranged to run. The band 14 is tensioned by mechanism for moving the drums apart. Rolls 22 maintain the flexible band in contact with the heated vulcanizing drum 10. The belting or other article to be vulcanized is fed from the let-off reel 15 to the bite between the surface of the rotatable drum 10 and the metal band 14, as illustrated at 26, and is vulcanized under the pressure of the band 14 during the passage of the belting around the periphery of said drum and, after leaving the drum, the belting is wound on a suitable reel 28.

Heretofore vulcanizing operations have been performed on elongated articles by feeding the article to and holding it tightly in contact with the vulcanizing drum or platen, the article being thus fed and vulcanized substantially in its normal condition and usually in an intermittent manner. The resulting product has been a vulcanized article lacking in uniformity particularly in that different portions or sections thereof have different amounts or degrees of inherent stretch. The machine illustrated herein has provision for eliminating this objectionable result and producing a product having substantially a uniform stretch coefficient throughout its length, this provision embodying means for placing the article under a relatively high tension as it is fed to the vulcanizing drum and for maintaining such tension during the vulcanizing operation. The stretching or tensioning mechanism, provided in conjunction with the machine above described, builds up the tension in the belting or other article to a predetermined high degree during its travel from the let-off roll 15 to the point 26 where it enters between the drum 10 and the belt 14 and maintains that requisite high tension upon the belting during vulcanization, while at the same time placing only a relatively small tension on the let-off mechanism and thereby not interfering with its usual and normal operation.

The said stretching or tensioning mechanism illustrated comprises a series of tensioning rolls 16, 17, 18, 19 and a tensioning sheave 20. The let-off reel 15 comprises a shell 21 upon which the belting or other vulcanizable material is wound, said shell having a square hole capable of receiving a square let-off shaft 24. The let-off shaft is mounted in the bearings 26—27 and is fitted at one end with a pulley sheave 28 which receives a tension strap 30. The tension strap 30 may be connected with any type of loading device desired, one form of such device being illustrated as comprising the lever 32 and weight 34. The belting to be vulcanized, after leaving the let-off reel 15, passes around the tensioning rolls 16, 17, 18, and 19 into the bite of the drum 10 at the point 26. The tensioning rolls are geared in train as illustrated and each is preferably finished with a roughened or fluted surface in order to reduce slippage of the belting thereon. The tension or brake sheave 20 is geared at a reduced ratio to one of the tension rolls and restrains the rotation of the entire series of said rolls. The degree to which the tension sheave 20 restrains the rotation of the tensioning rolls is dependent upon the weight 50 which is attached to the tension sheave by the tension or brake strap 52 and this weight may be varied in accordance with the amount of tension it is desired to have in the belt during the vulcanizing operation. The rotation of the drum 10 furnishes to the belting the driving tension T—1 necessary to overcome the resistance of the tensioning rolls and to operate the let-off reel and this driving tension T—1 is the predetermined tension under which it is desired to vulcanize the belting.

It is a well known fact that a belting passing around a pulley which offers resistance to rotation must be tensioned on the slack side and that this tension must bear a certain minimum relationship to the driving tension, otherwise slippage will ensue. The brake 30 provides a sufficient drag on the reel to keep the belting at T—5 taut and eliminate any slack therein and the belting between the rolls is held taut due to the relation of and progressive increase of surface speeds in the succeeding rolls as hereinafter described. From known laws governing the relationship of the driving tension and slack tension around tensioning rolls, the number of tensioning rolls which are required progressively to reduce the driving tension T—1 (vulcanizing tension) to a much lower tension at which it is desirable to have the let-off reel operate and which is indicated in the drawing as T—5 may be determined. Under ordinary operating conditions attending the manufacture of commercial rubber belting, the use of three or four tensioning rolls will be sufficient to reduce the driving tension T—1 (vulcanizing tension) to a tension value which is practicable for let-off control. The number of tensioning rolls required will, however, depend upon the strength characteristics of the material which is being tensioned and the tension at which it is desirable to vulcanize the material.

The invention also contemplates a control of the relative surface speeds of the different tensioning rolls 16, 17, 18 19 and this may be accomplished by varying the number of teeth in the gears of the driving train or by varying the diameters of the different tensioning rolls. In the embodiment of the invention herein illustrated, the desired variations in the relative surface speeds of the different tensioning rolls is produced by varying the number of teeth in the gears. The relative surface speeds of the successive tensioning rolls 16—19 increase progressively and the tension in the belting is thereby built up progressively during the feed over such rolls, the increase in surface speed of the succeeding rolls serving to take up the stretch which is produced in the belting. The required increase in the relative surface speeds necessary to cause and take up the stretch occurring in the belting in passing around the tensioning rolls is readily calculated from known laws and it is believed to be unnecessary for complete understanding of the present invention to discuss said laws herein. With a given material the stretch that takes place in the material when subjected to a given tension is known or may be determined by test. It will be understood, however, that the increase in tension relative to the increase in stretch rises as the stretching progresses and for this reason the rolls 16—19 will ordinarily be so related that the amount of stretch given to the belting at the succeeding stretching stages will progressively diminish as the stretching operation progresses. By taking up the stretch in the belting occurring between the different tensioning rolls as it passes around said rolls, slippage of the belt is minimized and possible slippage may be further reduced by providing as large an arcuate wrap as possible around each tensioning roll.

It will be understood that in passing from the roll 16 to the roll 19 the belting is stretched a predetermined amount, depending upon the relation of the rolls, resulting in the belting being placed under a high tension. It is desirable that the belting shall be delivered to the vulcanizing drum at a predetermined tension or stretch and such tension or stretch is controlled through the action of the sheave 20 and the tension band 52 which serve to restrain the rotation of the entire train 16—19 and therefore to impose a further tension on the belting at T—1. The tension at T—1 is the tension set up by the stretching operation as the belting passes over rolls 16—19 plus the tension required to overcome the drag provided by the band 52 and its weight 50. It will therefore be seen that the tension T—1 can be varied by varying the weight 50.

The present method and apparatus produces a vulcanized article, and particularly a rubber belting, in which the amount of stretch remaining in the article or belt after vulcanization is substantially uniform because of the fact that the article is vulcanized under constant and uniform tension. In certain cases it may be desirable to vulcanize the article while in a condition stretched to a given percentage of its length. In such cases the gear train of the tension rolls 16, 17, 18 and 19 may be geared directly to the rotating drum 10 of the vulcanizing machine by a suitable gearing (not shown) and the speed of the drum relative to that of the train so regulated as to produce the desired percentage of stretch.

While a preferred embodiment of the invention has been herein illustrated and described, it will be understood that the invention may be embodied in other forms within the scope of the following claims.

Having thus described the invention, what is claimed is:—

1. In a continuous vulcanizing machine, in combination, vulcanizing means including a rotatable heated vulcanizing drum, a let-off mechanism, and means cooperating with the article as it leaves the let-off mechanism for progressively increasing the tension therein during its passage to the vulcanizing drum.

2. In a continuous vulcanizing machine, in combination, vulcanizing means including a rotatable heated vulcanizing drum, a let-off mechanism, and means interposed between the let-off mechanism and the vulcanizing drum and cooperating with the article after it leaves the let-off mechanism for progressively increasing the tension in the article to a substantial amount.

3. In a continuous vulcanizing machine, in combination, vulcanizing means including a rotatable heated vulcanizing drum, a let-off mechanism, means interposed between the let-off mechanism and vulcanizing drum and cooperating with the article as it leaves the let-off mechanism for progressively increasing the tension in the article a substantial amount as it passes to the vulcanizing drum, said means comprising a series of tensioning rolls around which the elongated article is passed, and means for resisting the rotation of the tensioning rolls to thereby build up tension in the article.

4. In a machine for vulcanizing elongated rubber articles, in combination, a rotatable heated drum, means for exerting pressure on the article as it passes around the periphery of said drum, means for effecting vulcanization under heat and pressure, a let-off mechanism, and means interposed between the let-off mechanism and said drum and cooperating with said elongated article being fed to the drum to progressively increase the tension in the elongated article from a relatively low to a relatively high amount.

5. In a machine for vulcanizing elongated rubber articles, in combination, a rotatable heated drum, means for exerting pressure on the article as it passes around the periphery of said drum, means for effecting vulcanization under heat and pressure, a let-off mechanism, and means interposed between the let-off mechanism and said drum and cooperating with said elongated article being fed to the drum to progressively increase the tension in the elongated article from a relatively low to a relatively high amount whereby a relatively high predetermined tension is established in successive portions of the article being fed into contact with said drum.

6. In a continuous vulcanizing machine, in combination, vulcanizing means including a rotatable heated vulcanizing drum, a let-off mechanism for the article to be vulcanized, means cooperating with the article as it leaves the let-off mechanism for progressively increasing the tension therein during its passage to the vulcanizing drum, and means cooperating with the tensioning means for regulating the amount of tension established thereby.

7. A vulcanizing machine comprising in combination, a let-off mechanism, a rotary vulcanizing drum, means cooperating with the drum to press the article to be vulcanized thereonto and draw it from the let-off mechanism as the drum is rotated, means between the let-off mechanism and drum for building up a substantial tension in the article as it is drawn toward and onto the drum, and variable means cooperating with and resisting movement of the second named means whereby to place a further and predetermined tension on that portion of the article between said second named means and the drum as the article is drawn toward and onto the drum.

8. A continuous vulcanizing machine comprising in combination, a let-off mechanism, a rotary vulcanizing drum, an endless band passing around and in contact with a substantial arcuate portion of the drum, the band and drum being advanced continuously to receive therebetween and draw from the let-off mechanism rubber belting to be vulcanized, and means between the let-off mechanism and drum for building up a substantial tension in and elongation of the belting as it is drawn toward and onto the drum.

9. A method of continuously vulcanizing strip rubber belting or the like, consisting in continuously advancing the belting to vulcanizing position and progressively stretching the material to greater and greater tension and elongation at succeeding portions in its path of movement to such position and holding the belting in and under such tension and elongated condition during vulcanization thereof.

10. A method of continuously vulcanizing strip rubber belting or the like, consisting in continuously advancing the unvulcanized belting to vulcanizing position and progressively stretching the material to greater and greater tension and to a predetermined percentage of increase in its length at succeeding portions of its path of movement to such position and holding the belting in and under such tension and elongation during vulcanization thereof.

11. A continuous method of vulcanizing fabric-containing rubber belting or the like, consisting in continuously passing the belting to vulcanizing position and progressively stretching the belting to greater and greater tension and elongation in successive portions thereof during its passage to and as it approaches such position and holding the material in and under such tension and elongation during vulcanization thereof.

THOMAS M. KNOWLAND.